US010620667B2

(12) United States Patent
Janzen et al.

(10) Patent No.: US 10,620,667 B2
(45) Date of Patent: Apr. 14, 2020

(54) SECURE HOLDER FOR COMPUTER TABLETS AND DISPLAYS

(71) Applicant: Tryten Technologies Inc., Seattle, WA (US)

(72) Inventors: Tony Janzen, Langley (CA); Otto Baartman, Langley (CA); Jonathan Culley, Langley (CA)

(73) Assignee: Tryten Technologies Inc., Seattle, WA (US)

( * ) Notice: Subject to any disclaimer, the term of this patent is extended or adjusted under 35 U.S.C. 154(b) by 0 days.

(21) Appl. No.: 16/224,614

(22) Filed: Dec. 18, 2018

(65) Prior Publication Data

US 2019/0187754 A1 Jun. 20, 2019

Related U.S. Application Data

(60) Provisional application No. 62/607,855, filed on Dec. 19, 2017.

(51) Int. Cl.
| | | |
|---|---|---|
| *G06F 1/16* | (2006.01) | |
| *F16B 2/12* | (2006.01) | |
| *F16B 1/00* | (2006.01) | |
| *F16M 11/42* | (2006.01) | |
| *F16M 11/14* | (2006.01) | |

(Continued)

(52) U.S. Cl.
CPC ............ *G06F 1/1632* (2013.01); *A47B 23/04* (2013.01); *A47F 10/02* (2013.01); *F16B 1/0071* (2013.01); *F16B 2/12* (2013.01); *F16M 11/041* (2013.01); *F16M 11/14* (2013.01); *F16M 11/2021* (2013.01); *F16M 11/24* (2013.01);

(Continued)

(58) Field of Classification Search
CPC .......... G06F 1/1632; G06F 1/626; F16B 2/12; F16B 1/0071; F16M 11/42; F16M 11/08; F16M 11/14; F16M 13/00; A47B 23/04; A47F 1/02; A47F 7/0042
See application file for complete search history.

(56) References Cited

U.S. PATENT DOCUMENTS

| | | |
|---|---|---|
| D435,107 S | 12/2000 | Blair et al. |
| 7,274,564 B2 | 9/2007 | Rossini |

(Continued)

OTHER PUBLICATIONS

Extended European Search Report dated Apr. 26, 2019, issued in corresponding European Application No. 18214087.1, filed Dec. 19, 2018, 13 pages.

*Primary Examiner* — Tan Le

(57) ABSTRACT

A secure holder for an electronic display includes a body enclosing a cavity with four slots that slidably receive corresponding retaining members that are configured to adjustably and securely retain a display device. Left, right, and bottom retaining members include a proximal portion with slots that extend into the volume and a U-shaped portion extending away from the proximal portion. The slidable retaining members may be preset to retain a particular device with releasable locking members accessible from the front, prior to engaging the device. An upper retaining member is inserted into the body after positioning the device, and locked into place to securely retain the device. The secure holder includes view slots that expose a portion of the retaining members in the body, and indicia adjacent to the view slots allow the holder to be easily set for a particular device.

14 Claims, 5 Drawing Sheets

(51) Int. Cl.
*F16M 11/20* (2006.01)
*F16M 11/24* (2006.01)
*A47B 23/04* (2006.01)
*A47F 10/02* (2006.01)
*F16M 11/04* (2006.01)

(52) U.S. Cl.
CPC ........... *F16M 11/42* (2013.01); *G06F 1/1626* (2013.01); *F16B 2001/0064* (2013.01)

(56) References Cited

U.S. PATENT DOCUMENTS

| | | |
|---|---|---|
| D618,350 S | 6/2010 | Balas |
| D646,315 S | 10/2011 | Orf |
| D650,774 S | 12/2011 | Molter |
| D652,936 S | 1/2012 | Ross et al. |
| 8,240,628 B2 * | 8/2012 | Huang ................ F16M 11/041 248/122.1 |
| D692,436 S | 10/2013 | Hung |
| 8,568,141 B2 * | 10/2013 | Tanaka .................... A61M 5/20 433/90 |
| D697,919 S | 1/2014 | Gelsomini et al. |
| D700,706 S | 3/2014 | Molter |
| 8,711,553 B2 * | 4/2014 | Trinh .................... A47F 7/0246 248/206.5 |
| 8,836,716 B1 * | 9/2014 | Gaddy ..................... H04N 9/67 345/591 |
| 8,864,089 B2 * | 10/2014 | Hung ................... F16M 11/041 248/122.1 |
| D717,804 S | 11/2014 | Budge |
| D739,947 S | 9/2015 | Maier |
| D742,387 S | 11/2015 | Xiang et al. |
| D752,597 S | 3/2016 | Girault |
| D753,126 S | 4/2016 | Alesi et al. |
| D765,447 S | 9/2016 | Barham et al. |
| D765,646 S | 9/2016 | Deng et al. |
| 9,441,782 B2 | 9/2016 | Funk et al. |
| 9,470,356 B1 * | 10/2016 | Zaloom .................. F16M 11/12 |
| D778,283 S | 2/2017 | Tsai |
| D783,837 S | 4/2017 | Janzen |
| D796,047 S | 8/2017 | Janzen |
| D804,487 S | 12/2017 | Theis |
| D834,583 S | 11/2018 | Janzen et al. |
| D837,221 S | 1/2019 | Janzen et al. |
| D837,222 S | 1/2019 | Janzen et al. |
| D837,798 S | 1/2019 | Janzen et al. |
| 2008/0061195 A1 | 3/2008 | Carnevali |
| 2008/0142667 A1 | 6/2008 | German et al. |
| 2009/0294604 A1 | 12/2009 | Sunderland |
| 2011/0127392 A1 | 6/2011 | Carter |
| 2012/0025036 A1 * | 2/2012 | Huang ................ F16M 11/041 248/122.1 |
| 2012/0037783 A1 * | 2/2012 | Alexander ............. A47F 7/024 248/551 |
| 2013/0277520 A1 | 10/2013 | Funk et al. |
| 2013/0301216 A1 | 11/2013 | Trinh et al. |
| 2016/0367329 A1 | 12/2016 | Dekel |
| 2017/0188724 A1 | 7/2017 | Lin |

* cited by examiner

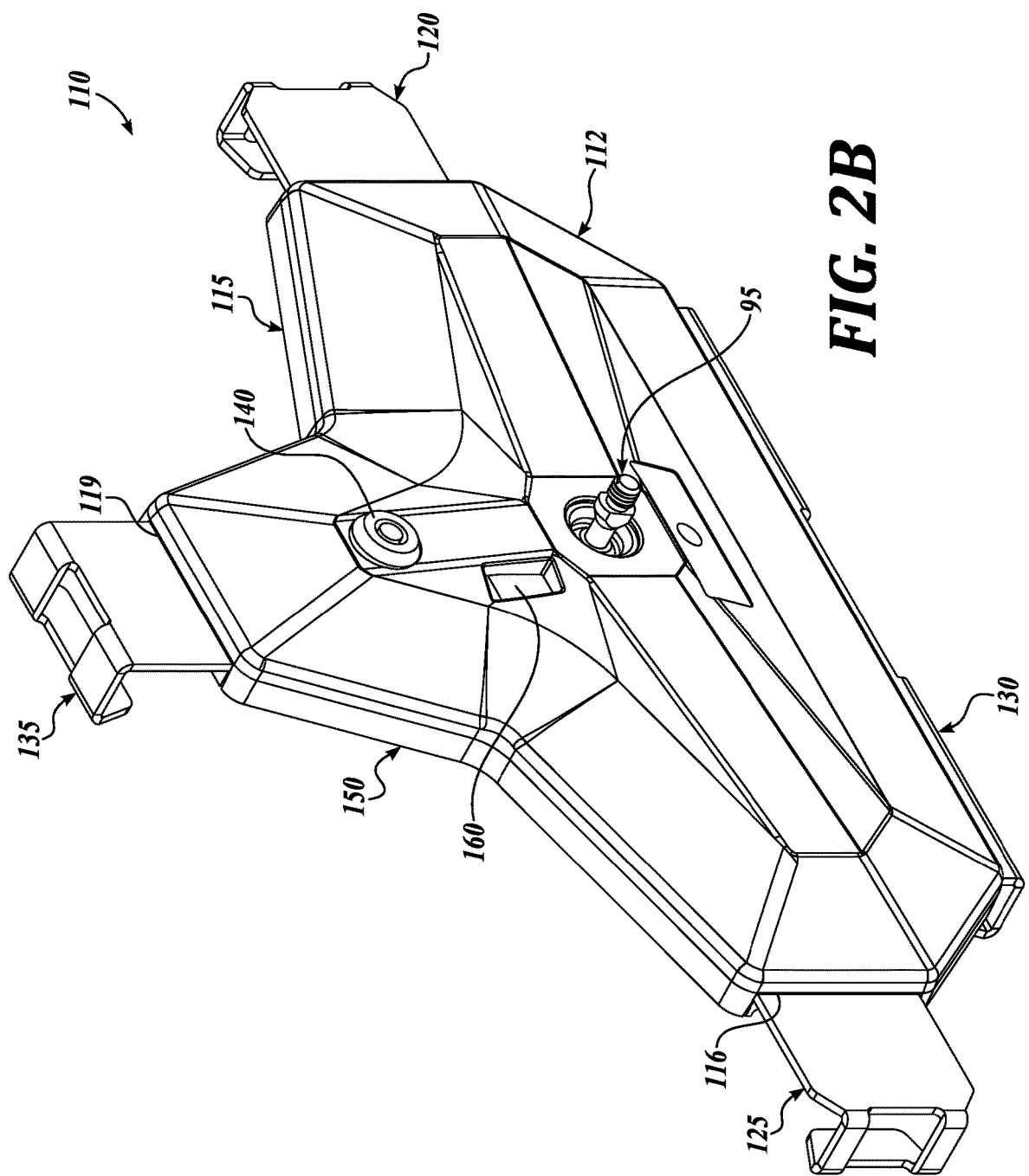

SECURE HOLDER FOR COMPUTER TABLETS AND DISPLAYS

CROSS-REFERENCE TO RELATED APPLICATION

This application claims the benefit of Provisional Application No. 62/607,855, filed Dec. 19, 2017; the entire disclosure of said application is hereby incorporated by reference herein.

BACKGROUND

Portable computing devices and displays are ubiquitous in modern life. For example, tablet type computing devices are used as information kiosks at point-of-sale locations, allowing consumers to select and view information regarding one or more on-sale products. Electronic displays, including tablet computers, are also increasingly being used in medical settings such as hospitals and doctors' offices, for example, to display patient information or to display information received from patient monitoring devices.

Such devices and displays, however, are inherently portable, and therefore subject to being taken or moved by unauthorized persons. Therefore, it would be beneficial to provide a lockable system for retaining such devices during use that do not interfere with the device performing its display function.

Portable computing devices and displays come in a wide variety of sizes and shapes. Typically, they are rectangular, with a relatively narrow thickness. For example, some portable computing devices include a keyboard portion that is configured to be operable as a laptop mode with the display portion extending from a back side of the keyboard portion, or in a tablet mode with the keyboard moved to a position directly behind the display portion. Other portable computing devices are simply tablet computers. In other systems a flat display may be removably connected, or tethered with a data cable, to a computing or patient monitoring device. Whatever the system arrangement, it may be beneficial to provide a lockable retaining support that holds at least the display portion of the system in a convenient manner to permit a user to view and possibly interact with the display portion, while also lockably restraining the display.

In many applications, for example, in medical facilities, it would be useful to have a display retaining and supporting system that can support and retain different display devices, wherein the different devices have a variety of sizes and shapes. Therefore a lockable retaining device that can be readily adjusted by a user to accommodate different display devices, while also being lockable in any selected size, would be beneficial. In particular, it would be beneficial to facilitate a user in adjusting the lockable retaining device to accommodate the different display devices.

In U.S. Pat. No. 7,274,564, to Rossini, which is hereby incorporated by reference in its entirety, a locking cradle for tablet computers is disclosed. However, Rossini does not disclose a mechanism that is adjustable in different transverse directions and wherein a single locking mechanism would enable securing and releasing the tablet computer from the support. Rossini also does not contemplate a system to facilitate setting retaining elements to accommodate different sizes of devices.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A secure holder for an electronic display device includes a body having a shell defining a front opening and a faceplate attachable to the shell over the front opening such that a volume is enclosed between the shell and the faceplate. The body has first and second slots located on opposite sides of the body, and third and fourth slots located on opposite sides of the body transverse to the first and second slots. A first retaining member includes a proximal portion having an elongate hole. The plate portion is slidably disposed in the first slot. The first retaining member has a U-shaped portion extending away from the proximal portion, away from the body. A second retaining member has a proximal portion having an elongate hole and slidably disposed in the second slot, and a U-shaped portion extending away from the body from the proximal portion. A third retaining member has a proximal portion having an elongate hole and slidably disposed in the third slot, and a U-shaped portion extending away from the body from the proximal portion. A fourth retaining member has a proximal portion having a plurality of aligned apertures and configured to be slidably inserted into the fourth slot, and a U-shaped portion extending from the proximal portion. A first locking member extends through a first aperture in the faceplate and through the elongate hole in the first retaining member to engage the shell. The first locking member is movable between a release position wherein the first retaining member is slidable in the first slot and a lock position wherein the first retaining member is prevented from sliding in the first slot. A second locking member extends through a second aperture in the faceplate and through the elongate hole in the second retaining member to engage the shell. The second locking member is movable between a release position wherein the second retaining member is slidable in the second slot and a lock position wherein the second retaining member is prevented from sliding in the second slot. A third locking member extends through a third aperture in the faceplate and through the elongate hole in the third retaining member to engage the shell. The third locking member is movable between a release position wherein the third retaining member is slidable in the third slot and a lock position wherein the third retaining member is prevented from sliding in the third slot. A fourth locking member is accessible from a back side of the shell that is configured to be inserted into a selectable one of the plurality of aligned apertures in the fourth retaining member. The fourth locking member is movable between a non-engaged position wherein the fourth locking member is not inserted into any of the plurality of circular apertures such that the fourth retaining member is slidable in the fourth slot, and an engaged position wherein the locking member extends through one of the plurality of aligned apertures such that the fourth retaining member is not slidable in the fourth slot.

In an embodiment the plurality of aligned apertures overlap to define an elongate slot configured to receive the locking member in a plurality of discrete locations.

In an embodiment the plurality of overlapping aligned apertures are circular.

In an embodiment the faceplate further comprises a connector aperture configured to receive a wired connector therethrough and a channel defined on a face of the faceplate and extending from the connector aperture to a side of the faceplate.

In an embodiment the faceplate further includes an elongate viewing slot positioned such that an end of the proximal portion of the first retaining member is visible through the viewing slot.

In an embodiment the faceplate further has a plurality of indicia spaced along a side of the viewing slot.

In an embodiment the faceplate further includes a cantilevered pin extending into the body volume, and further wherein the first retaining member comprises an elongate positioning slot comprising an edge defining a plurality of periodic recesses, wherein the cantilevered pin is positioned to extend into the positioning slot and to engage the periodic recesses, defining discrete stop positions for the first retaining member.

In an embodiment the plurality of periodic recesses each correspond with one of the plurality of spaced indicia.

In an embodiment the faceplate has a second elongate viewing slot positioned such that an end of the proximal portion of the second retaining member is visible through the second viewing slot, and a second plurality of indicia are spaced along a side of the second viewing slot.

In an embodiment the faceplate has a retaining slot configured to retain a tool configured to selectively engage the first, second, and third locking members to move the locking members between the locking member between the release position and the lock position.

In an embodiment the hinge ball joint with a housing is fixed to the shell and includes a ball and rod member that is hingedly retained by the housing.

In an embodiment the first retaining members further defines an aperture through the U-shaped distal portion.

A mobile stand includes a base supporting an articulated pole, and includes the secure holder for an electronic display discussed above that is hingedly attached to the articulated pole.

In an embodiment the base is a wheeled base.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 2B is a back-left perspective view of the secure holder shown in FIG. 1;

DETAILED DESCRIPTION

Figure 1:
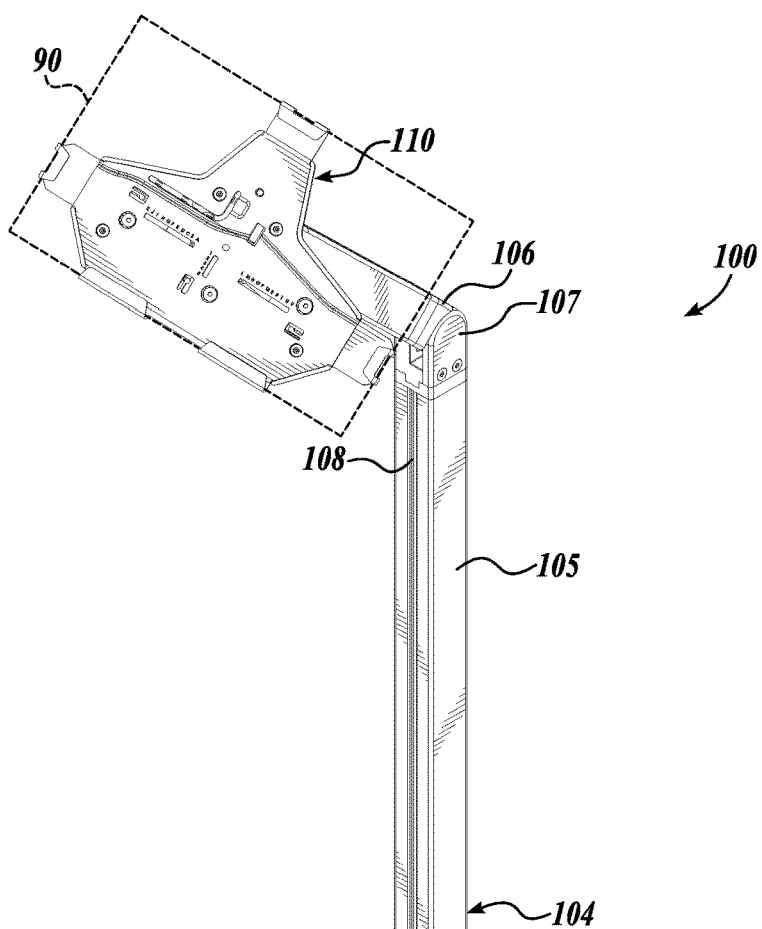
FIG. 1 is an environmental view showing a mobile stand with a secure holder for computer tablets and displays in accordance with the present invention.
Figure 1:
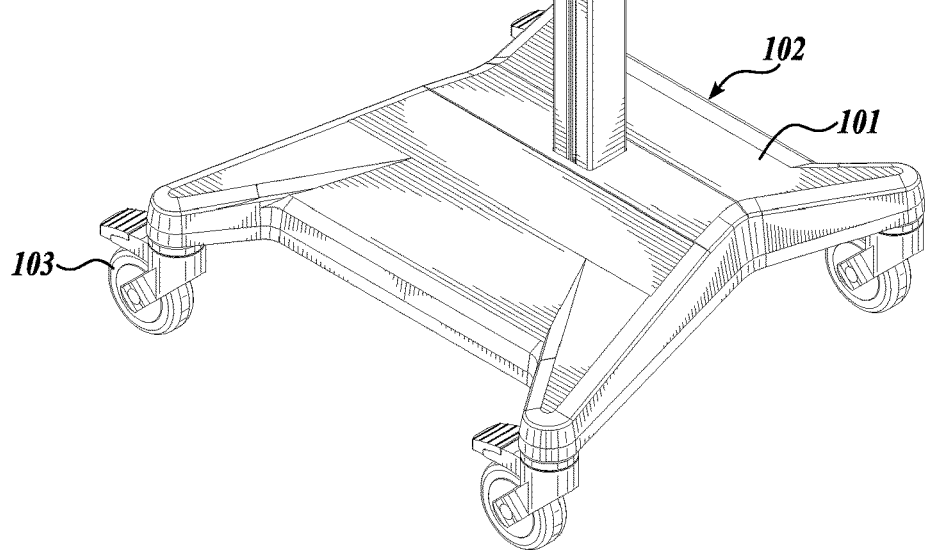

A mobile stand 100 for an electronic display device that includes a secure holder 110 for an electronic display device 90 in accordance with the present invention is shown in FIG. 1. The display device 90 may be, for example, a computer display, a tablet computer, a medical device display, or the like.

The mobile stand 100 in this embodiment includes a base assembly 102 supporting an articulated pole 104 that is fixed to the base assembly 102. The base assembly 102 includes a body portion 101 and a plurality of wheels 103 supporting the body portion 101, typically three, four, or more wheels 103. Currently one or more of the wheels 103 are lockable. The articulated pole 104 includes a vertical post 105 that extends from the base assembly 102 and an arm 106 attached in an articulated joint 107 to an upper portion of the post 105. The post 105 may include one or more channels 108 extending along a length of the post 105 for adjustably mounting auxiliary components such as handles, power adaptors, cord keepers, horizontal support platforms, and the like. An opposite end of the arm 106 is configured to support the secure holder 110. For example, the secure holder 110 may be attached to the arm 106 with a conventional multi-axis hinge ball joint 95 (see, FIG. 2B), as disclosed, for example, in U.S. Pat. No. 9,341,009, to Triebold et al., which is hereby incorporated by reference in its entirety.

The secure holder 110 provides a secure and easily configured mechanism for securely retaining any of a wide variety of display devices 90 on the support structure such as the mobile stand 100 with edge connectors of the display device 90 accessible and the display face of the device 90 viewable, and/or while transporting the display device 90 and mobile stand 100 between locations.

Figure 2A:
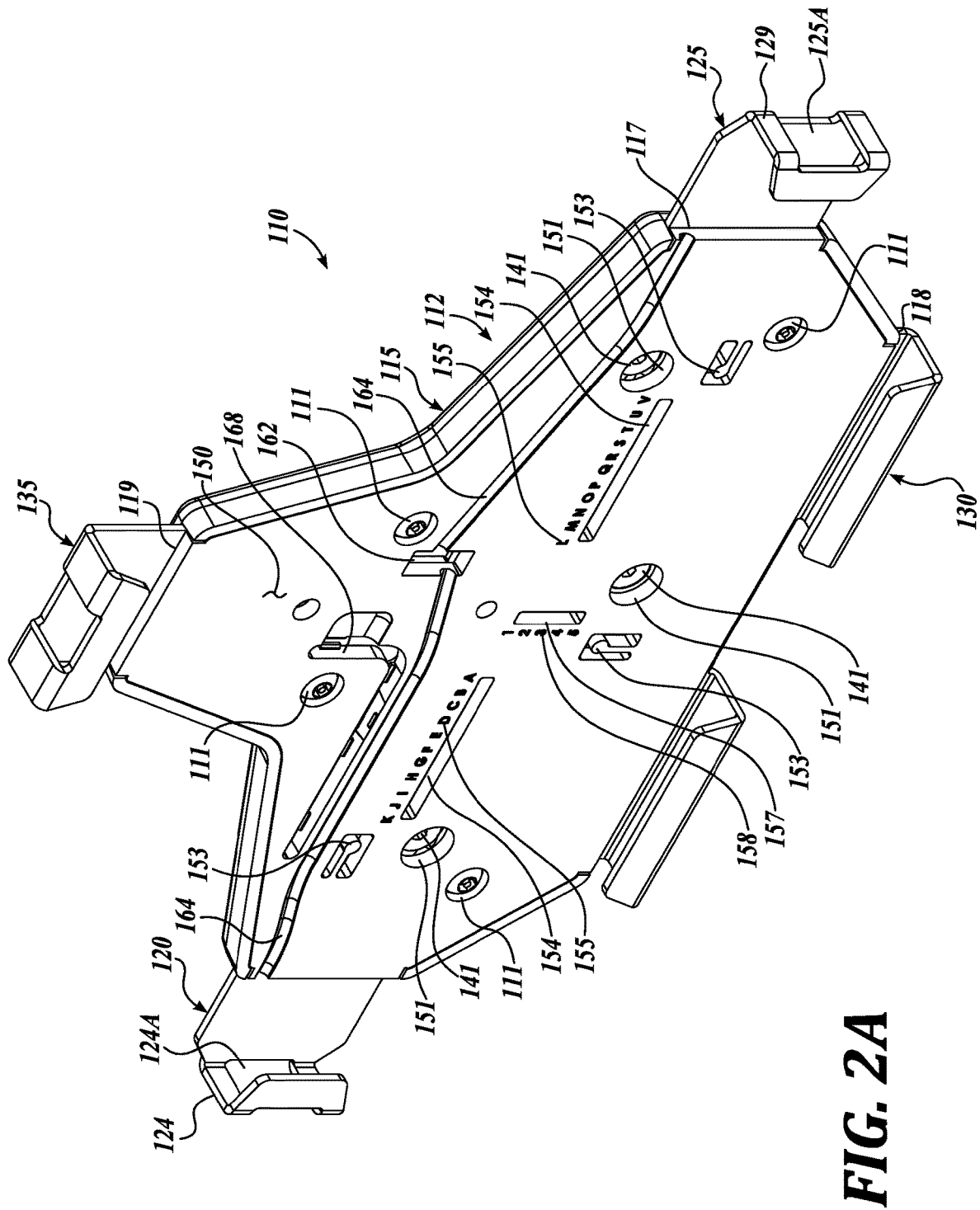
FIG. 2A is a front-right perspective view of the secure holder shown in FIG. 1.

Refer now to FIG. 2A and FIG. 2B, which show front and back perspective views respectively of the secure holder 110 in isolation. The secure holder 110 includes a base assembly 112 having a back shell 115 and a faceplate 150 that is attached to the shell 115, for example, with a plurality of bolts 111 (four shown). For example, the shell 115 may include imbedded threaded inserts (not shown) configured to engage the bolts 111. The shell 115 and faceplate 150 define an enclosed volume there between. A left retaining member 120 and a right retaining member 125 are disposed on opposite sides of the base assembly 112 and extend into the enclosed volume through narrow openings or slots 116, 117 defined between the faceplate 150 and the shell 115. A lower retaining member 130 and an upper retaining member 135 are disposed on opposite sides of the base assembly 112 transverse to the left and right retaining members 120, 125, and extend through corresponding narrow openings or slots 118, 119. As seen most clearly in FIG. 4, a hinge ball joint 95 in this embodiment includes a housing portion 95A that is fixed to the shell 115 with a plurality of fasteners 95C, and a ball and rod member 95B that is hingedly retained by the housing portion 95A.

Figure 3:
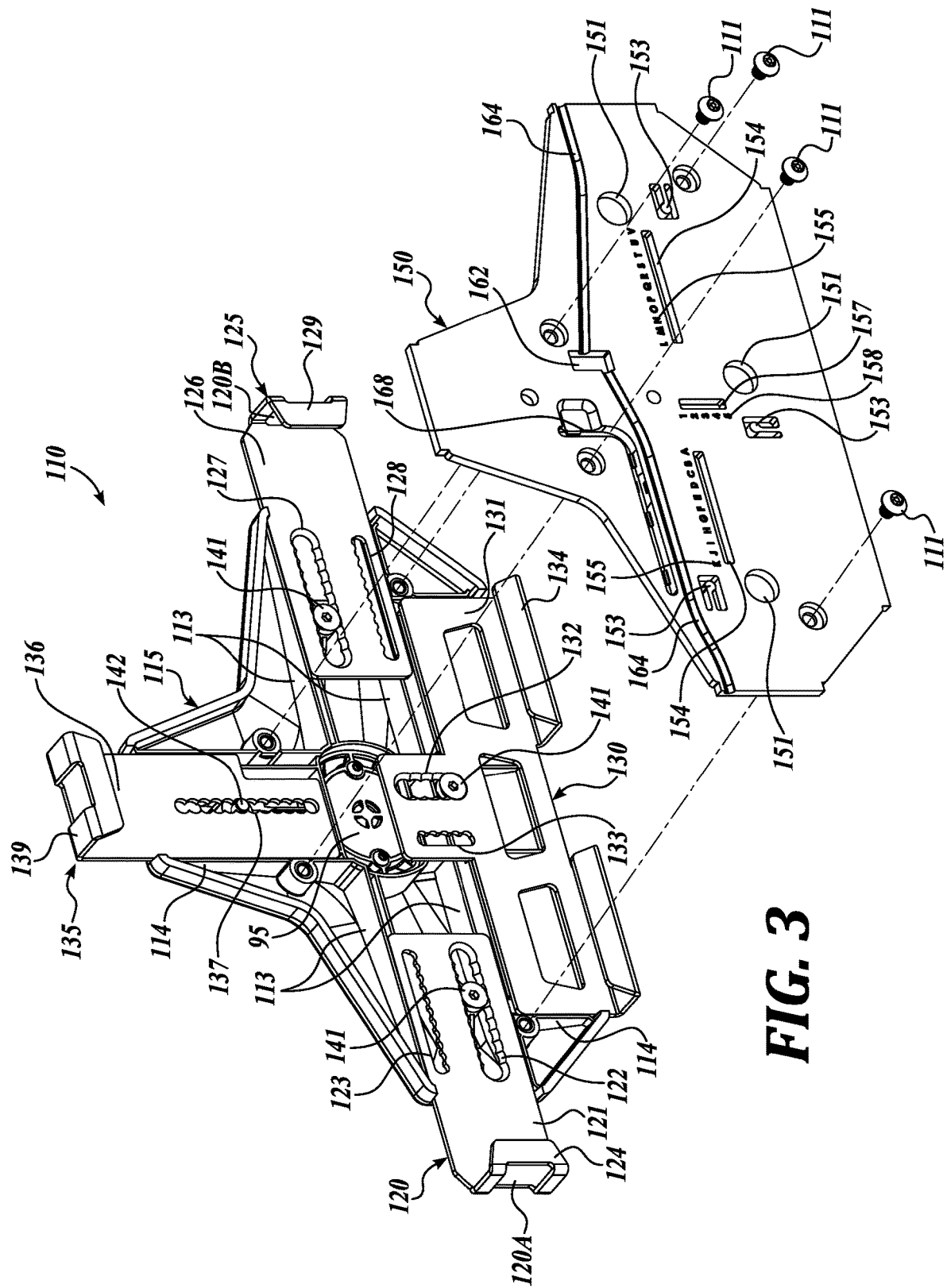
FIG. 3 shows the secure holder shown in FIG. 1, with the faceplate separated from the back shell.
Figure 4:
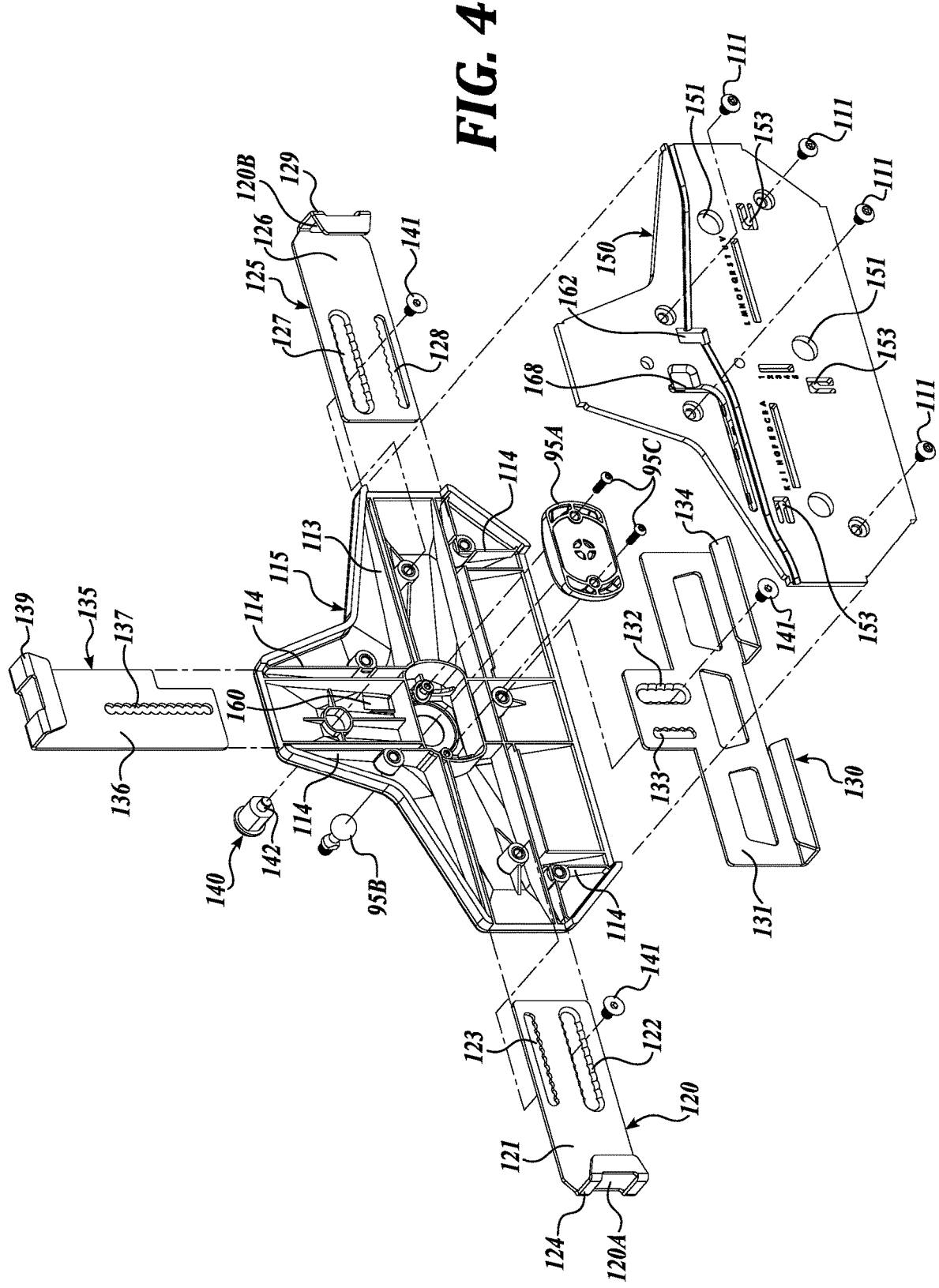
FIG. 4 is an exploded view of the secure holder shown in FIG. 1.

Refer also to FIG. 3, which shows the secure holder 110 with the faceplate 150 exploded away from the shell 115, and to FIG. 4 which shows a more exploded view of the secure holder 110.

The left and right retaining members 120, 125 each include proximal portions 121, 126 that extend into the enclosed volume, and hook portions 124, 129 that extend away from the base assembly 112. The shell 115 includes left and right spaced-apart horizontal rails 113 that are sized to receive and guide the retaining member proximal portions 121, 126 along the base assembly 112. The proximal portions 121, 126 have first elongate slots 122 and 127 respectively. Locking members 141, for example bolts, extend through holes 151 in the faceplate 150, and through a corresponding one of the first elongate slots 122, 127. The locking members 141 adjustably engage the back shell 115 to lock the left and right retaining members 120, 125 at a desired selectable location in the base assembly 112. For example, the back shell 115 may include threaded inserts (not shown) embedded in the shell 115 that are configured to engage the locking members 141. Optionally, the faceplate 150 may further includes a channel or recess 168 for retaining a tool (not shown), for example a hex wrench or the like, for loosening and tightening the locking members 141.

The hook portions 124, 129 extend away from the base assembly 112 and define a generally U-shaped portion that extends forwardly away from the faceplate 150 and then inwardly towards the base assembly 112. The hook portions 124, 129 are configured to engage and retain an outer edge of the display device 90 (FIG. 1) during use.

In this embodiment the retaining member proximal portions 121, 126 also include elongate positioning slots 123, 128, respectively. The positioning slots 123, 128 have at least one edge defining a plurality of periodic recesses defining a plurality of stop positions. The faceplate 150 includes integral cantilevered pins 153 that extend inwardly into the volume defined between the faceplate 150 and the shell 115, and into a corresponding one of the positioning slots 123, 128 to engage against the periodic edge of the positioning slot 123, 128. It will now be appreciated that the positioning slots 123, 128 and cantilevered pins 153 define a discrete number of stop positions for the left and right retaining members 120, 125.

The lower retaining member 130 similarly includes a proximal portion 131 and a hook portion 134. The proximal portion 131 engages lower vertical rails 114 on the shell 115. The proximal portion 131 includes an elongate slot 132. A locking member 141, for example a bolt, extends through the slot 132 and engages the back shell 115 to selectively lock the lower retaining member 130 in a desired vertical position. A vertical positioning slot 133 having a shaped edge defining a plurality of periodic recesses engages a third cantilevered pin 153 formed in the faceplate 150. The recesses define a discrete number of stop positions for the lower retaining member 130.

The faceplate 150 includes one or more horizontal view ports 154 that are sized and positioned to allow the user to see the position of the inner vertical edge of the proximal portions 121, 126 of the left and right retaining members 120, 125. Indicia 155, for example, a horizontal row of alphanumeric characters printed above the horizontal view ports 154, are positioned to correspond with the discrete stop positions defined by the periodic recesses of the positioning slots 123, 128. Similarly, a vertical view port 157 in the faceplate 150 is sized and positioned to allow the user to see the position of the upper horizontal edge of the proximal portion 131 of the lower retaining member 130. Indicia 158, for example, a vertical row of alphanumeric characters printed adjacent the vertical view port 157 are positioned to correspond with the discrete stop positions defined by the periodic recesses of the positioning slot 133.

The upper retaining member 135 includes a proximal portion 136 and a hook portion 139. The proximal portion 136 engages upper vertical rails 114 on the shell 115, and includes a vertical row of circular apertures 137. It is contemplated that the apertures may alternatively be adjacent or spaced apart. A keyed locking device 140 (see FIGS. 2B and 4) is installed in a back side of the shell 115, and is configured to be movable from a locked position wherein a cylinder portion 142 extends through and engages a selected one of the plurality of circular apertures defining the slot 137, and an unlock position wherein the cylinder 142 does not engage the slot 137. In this embodiment the circular apertures overlap to define an elongate locking slot 137 with narrow portions between the overlapping apertures. When the locking member 140 is in the locked position (extending through a selected one of the circular apertures) the engagement of the cylinder 142 with the selected aperture locks the slidable position of the upper retaining member 135 in the selected position.

A currently preferred method of installing the display device 90 in the secure holder 110 will now be described. A set of indicia values are obtained for the particular display device 90 to be installed. The indicia values identify the corresponding values for indicia 155 and 158 that will position the subject display device 90 in a desired position on the secure holder 110. The upper retaining member 135 is removed (or slid upwardly such that the hook portion 139 does not interfere with insertion of the display device 90) by retracting the cylinder 142 from engagement with the slot 137 and lifting the upper retaining member 135. The locking member 141 for the lower retaining member 130 is loosened or otherwise moved to a release position allowing the lower retaining member 130 to be moved vertically until the edge of the proximal portion 131 visible through the view port 157 is aligned with the indicia value obtained (i.e., matching the desired indicia value in indicia column 158) for the lower retaining member 130. The bottom locking member 141 is then retightened or otherwise moved to a lock position, locking the retaining member 135 in the desired location. Similarly, the locking members 141 for the left and right retaining members 120, 125 are loosened and the retaining members 120, 125 are positioned such that the edge visible through the horizontal view ports 154 are aligned with the corresponding indicia values obtained (for indicia rows 155). In other embodiments the left and right retaining members may not be symmetrically positioned. The locking members 141 for the left and right retaining members 120, 125 are then retightened.

The display device 90 is then slid downwardly through the hook portions 124, 129 of the left and right retaining members 120, 125 and into the hook portion 134 of the lower retaining member 130. It should be appreciated that the display device 90 in this position will prevent access to the locking members 141 for the left, right, and lower retaining members 120, 125, 130. The upper retaining member 135 is then inserted through the slot 119 (see, FIG. 2A) of the secure holder 110, and lowered until the hook portion 139 overlies an upper edge of the display device 90. The keyed locking member 140 is then moved to a locking position, wherein the cylinder 142 engages one of the overlapping apertures 137, thereby securing the display device 90 in the secure holder 110.

The secure holder 110 provides several advantages. For example, the vertical position of the lower retaining member 130 may be independently set, relative to the left and right retaining members 120, 125. Therefore, the vertical position of the display device may be set to accommodate different display devices, and to prevent the left and right retaining members from interfering with any controls or connectors on or near the lateral edges of a particular display device. Similarly, the left and right retaining members 120, 125 may be independently set to accommodate different display devices. Therefore, the horizontal position of the display device 90 may be set to accommodate different display devices, and to prevent the upper and lower retaining members 135, 130 from interfering with controls, connectors, cameras, etc. on or near the top and/or bottom edges of the display device 90.

The indicia 155, 158 and view ports 154, 157 allow a technician or user to readily and consistently set up the secure holder 110 correctly for any specified display device, without needing to have the display device in hand. The secure holder 110, therefore, can be preset to the correct settings, then transported to the user, who can merely remove the upper retaining member 135, place the display device 90 on the holder 110, reinsert the upper retaining member 135, and locking it in place using the keyed locking member 140.

Referring not to FIGS. 2A and 2B, the back shell 112 in this embodiment includes an access aperture 160 that is large enough to accommodate a cord for example a power cord (not shown) to enter the secure holder 110 from the back. The faceplate 150 includes a corresponding aperture 162, also sized to accommodate the cord. One or more cord channels 164 (two shown) on the front face of the faceplate 150 extend from the aperture 162 to a corresponding one of the narrow openings 116, 117 for the retaining members 120, 125. In this embodiment, the cord, for example a power cord, may be inserted in the back through apertures 160, 162 and positioned in a selected one of the cord channels 164 and through an aperture 120A or 125A provided in the retaining member 120, 125 prior to inserting the display device 90 in the secure holder 110. The cord may then be inserted into the appropriate socket or receiver on the display device 90. This system protects the cord, positions the cord to avoid interfering with use of the display device 90, and secures the cord preventing or discouraging unauthorized removal of the cord.

It will be appreciated that an advantage of this embodiment is that the position of all four of the retaining members 120, 125, 130, and 135 are adjustable. This allows the user to select the vertical and horizontal position of the display device 90 with respect to the body of the secure holder 110. Therefore the retaining members may be positioned to expose any desired region on the peripheral edge of the display device 90. For example, the lower retaining member 130 can be positioned to prevent the left or right retaining members from interfering with access to a port on the display device 90, and/or the left and right retaining members 125, 130 may be positioned to avoid the upper or lower retaining members from interfering with access to a port.

While illustrative embodiments have been illustrated and described, it will be appreciated that various changes can be made therein without departing from the spirit and scope of the invention.

The embodiments of the invention in which an exclusive property or privilege is claimed are defined as follows:

1. A secure holder for an electronic display device comprising:
    a body comprising a shell defining a front opening, and a faceplate configured to attach to the shell over the front opening such that a volume is enclosed between the shell and the faceplate, the body defining first and second slots located on opposite sides of the body, and third and fourth slots located on opposite sides of the body and transverse to the first and second slots;
    a first retaining member comprising a proximal portion slidably disposed in the first slot, the plate portion having an elongate hole, and a U-shaped portion extending from the proximal portion away from the body;
    a second retaining member comprising a proximal portion slidably disposed in the second slot, the plate portion having an elongate hole, and a U-shaped portion extending from the proximal portion away from the body;
    a third retaining member comprising a proximal portion slidably disposed in the third slot, the plate portion having an elongate hole, and a U-shaped portion extending from the proximal portion away from the body;
    a fourth retaining member comprising a proximal portion having a plurality of aligned apertures and configured to be slidably inserted into the fourth slot, and a U-shaped portion extending from the proximal portion;
    a first locking member that extends through a first aperture in the faceplate and through the elongate hole in the first retaining member to engage the shell, the first locking member being movable between a release position wherein the first retaining member is slidable in the first slot and a lock position wherein the first retaining member is prevented from sliding in the first slot;
    a second locking member that extends through a second aperture in the faceplate and through the elongate hole in the second retaining member to engage the shell, the second locking member being movable between a release position wherein the second retaining member is slidable in the second slot and a lock position wherein the second retaining member is prevented from sliding in the second slot;
    a third locking member that extends through a third aperture in the faceplate and through the elongate hole in the third retaining member to engage the shell, the third locking member being movable between a release position wherein the third retaining member is slidable in the third slot and a lock position wherein the third retaining member is prevented from sliding in the third slot;
    a fourth locking member accessible from a back side of the shell and configured to be inserted into a selectable one of the plurality of aligned apertures in the fourth retaining member, the fourth locking member being movable between a non-engaged position wherein the fourth locking member is not inserted into any of the plurality of circular apertures such that the fourth retaining member is slidable in the fourth slot, and an engaged position wherein the locking member extends through one of the plurality of aligned apertures such that the fourth retaining member is not slidable in the fourth slot.

2. The secure holder of claim 1, wherein the plurality of aligned apertures overlap to define an elongate slot configured to receive the locking member in a plurality of discrete locations.

3. The secure holder of claim 2 wherein the plurality of overlapping aligned apertures are circular.

4. The secure holder of claim 1, wherein the faceplate further comprises a connector aperture configured to receive a wired connector therethrough and a channel defined on a face of the faceplate and extending from the connector aperture to a side of the faceplate.

5. The secure holder of claim 1, wherein the faceplate further comprises an elongate viewing slot positioned such that an end of the proximal portion of the first retaining member is visible through the viewing slot.

6. The secure holder of claim 5, wherein the faceplate further comprises a plurality of indicia spaced along a side of the viewing slot.

7. The secure holder of claim 6, wherein the faceplate further comprises a cantilevered pin extending into the body volume, and further wherein the first retaining member comprises an elongate positioning slot comprising an edge defining a plurality of periodic recesses, wherein the cantilevered pin is positioned to extend into the positioning slot and to engage the periodic recesses, defining discrete stop positions for the first retaining member.

8. The secure holder of claim 7, wherein the plurality of periodic recesses each correspond with one of the plurality of spaced indicia.

9. The secure holder of claim 8, wherein the faceplate further comprises a second elongate viewing slot positioned such that an end of the proximal portion of the second retaining member is visible through the second viewing slot, and a second plurality of indicia are spaced along a side of the second viewing slot.

10. The secure holder of claim 1, wherein the faceplate further comprises a retaining slot configured to retain a tool configured to selectively engage the first, second, and third locking members to move the locking members between the locking member between the release position and the lock position.

11. The secure holder of claim 1, further comprising a hinge ball joint comprising a housing that is fixed to the shell and a ball and rod member that is hingedly retained by the housing.

12. The secure holder of claim 1, wherein the first retaining members further defines an aperture through the U-shaped distal portion.

13. A mobile stand comprising a base supporting an articulated pole, wherein the secure holder for an electronic display of claim 1 is hingedly attached to the articulated pole.

14. The mobile stand of claim 13, wherein the base comprises a wheeled base.

* * * * *